Figure 1:
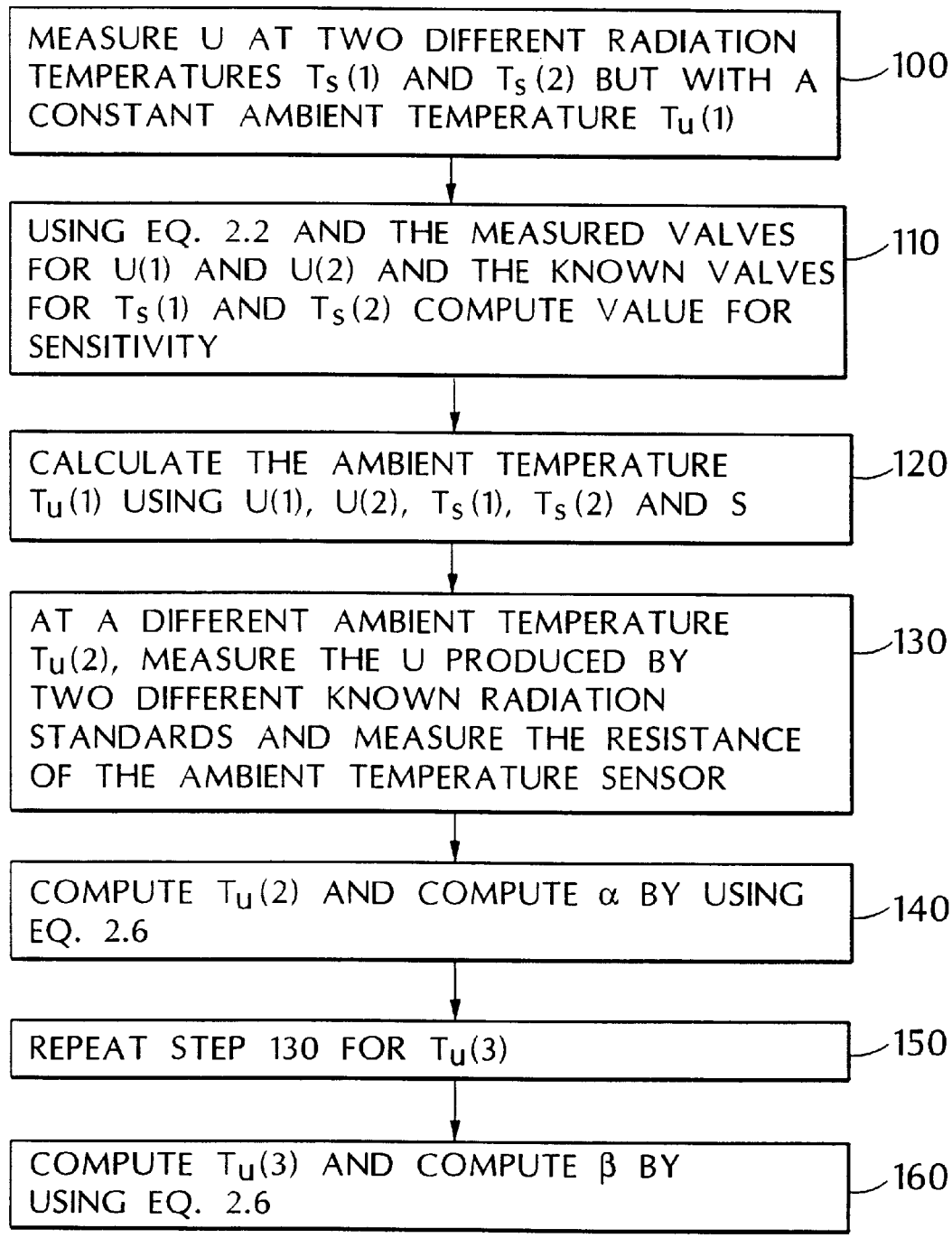

ized
United States Patent

Kraus et al.

[11] Patent Number: 6,065,866
[45] Date of Patent: May 23, 2000

[54] METHOD OF CALIBRATING A RADIATION THERMOMETER

[75] Inventors: Bernhard Kraus, Braunfels; Frank Beerwerth, Runkel-Ennerich; Klaus Heubach, Bad Camberg; Manfred Kaiser, Karben, all of Germany

[73] Assignee: Braun Aktiengesellschaft, Germany

[21] Appl. No.: 08/976,354

[22] Filed: Nov. 21, 1997

Related U.S. Application Data

[63] Continuation of application No. PCT/EP97/01531, Mar. 26, 1997.

[30] Foreign Application Priority Data

Apr. 2, 1996 [DE] Germany ............................ 196 13 229

[51] Int. Cl.[7] ........................................ G01K 15/00
[52] U.S. Cl. ........................................... 374/2
[58] Field of Search .................................... 374/2

[56] References Cited

U.S. PATENT DOCUMENTS

| 3,318,133 | 5/1967 | Hahn .................................. 374/2 |
| 4,464,725 | 8/1984 | Briefer ............................... 702/101 |
| 4,634,294 | 1/1987 | Christol ............................ 374/170 |
| 4,784,149 | 11/1988 | Berman et al. .................... 600/474 |
| 4,790,324 | 12/1988 | O'Hara et al. ................... 600/474 |
| 4,993,419 | 2/1991 | Pompei et al. ................... 600/474 |
| 5,001,657 | 3/1991 | Yagura et al. ....................... 702/99 |
| 5,150,969 | 9/1992 | Goldberg et al. ................ 374/128 |
| 5,333,784 | 8/1994 | Pompei ............................. 236/91 C |

FOREIGN PATENT DOCUMENTS

| 0 446 788 | 9/1991 | European Pat. Off. . |
| 44 12 973 | 11/1994 | Germany . |
| 62-291526 | 12/1987 | Japan . |
| WO 93 03666 | 3/1993 | WIPO . |

*Primary Examiner*—Diego Gutierrez
*Assistant Examiner*—Stanley J. Pruchnic, Jr.
*Attorney, Agent, or Firm*—Fish & Richardson P.C.

[57] ABSTRACT

A method of calibrating a radiation thermometer including a radiation sensor and an ambient temperature sensor, the method including the steps of using a first radiation standard having a known temperature $T_S(1)$ and with the ambient temperature sensor at a first ambient temperature $T_U(1)$, using the radiation thermometer to read the temperature of the first radiation standard and while doing so, measuring a first output signal $U(1)$ of the radiation sensor; using a second radiation standard having a known temperature $T_S(2)$ and with the ambient temperature sensor again at the first ambient temperature $T_U(1)$, using the radiation thermometer to read the temperature of the second radiation standard and while doing so, measuring a second output signal $U(2)$ of the radiation sensor; and calibrating the radiation sensor and the ambient temperature sensor by using the values obtained for $U(1)$ and $U(2)$ and without using a value for $T_U(1)$ that is derived from measuring an output of the ambient sensor.

6 Claims, 1 Drawing Sheet

METHOD OF CALIBRATING A RADIATION THERMOMETER

This is a continuation of Application Ser. No. PCT/EP97/01531, filed Mar. 26, 1997.

This invention relates to a method of calibrating a radiation thermometer, which comprises a radiation sensor and an ambient temperature sensor, by means of a radiation standard with known temperature.

By means of a radiation sensor, the temperature differential between an object of measurement and a reference object—for example, a shutter or the radiation sensor itself—can be determined. In order to determine the absolute temperature of the object of measurement, additional knowledge is required of the temperature of the reference object. This temperature is conveniently determined by means of a temperature sensor thermally connected to the reference object in the best possible manner.

In the calibration of a radiation thermometer which incorporates a radiation sensor and an ambient temperature sensor, it is thus necessary to calibrate both sensors. In prior-art calibration methods, the output signals of the two sensors are determined at different radiation and ambient or reference temperatures. From these signals, the corresponding calibration parameters can then be established. To calibrate the ambient temperature sensor, the ambient temperature (possibly also several ambient temperatures) is (are) determined by means of an external, calibrated thermometer. The temperature of the external thermometer has to come as close as possible to the temperature of the sensor to be calibrated (for example, by immersing the sensor and the thermometer in the same liquid or by a prolonged adaptation period). The calibration of the ambient temperature sensor is thus conducted independently of the calibration of the radiation sensor.

Applicant knows from the field of control engineering that the time response of a system is described with reference to specified system quantities as well as parameters which ultimately describe the time response of the total system. To determine these parameters, it is known in the art to detect the system quantities variable with time and, using the detected quantities, to solve the system of equations for the parameters. On the basis of the parameters thus established, it is thus possible to describe the system's time response for the future. This method has become known in the art under the term referred to as process parameter identification. This method involves an overdetermination of the system of equations, that is, more pairs of measuring quantities are detected than are actually required, so that, for example, six equations are available for four quantities to be determined. The parameters to be established are determined by means of these six equations such that, for example, the square errors are minimized. This enables inaccuracies in the measurement of individual system quantities to be compensated for.

It is an object of the present invention to indicate a method which enables the calibration of a radiation thermometer to be performed in simple manner, said radiation thermometer including a radiation sensor and an ambient temperature sensor.

FIG. 1 shows the steps of calibrating a radiation thermometer in accordance with the invention.

The essential feature of the method of the present invention is the fact that, for calibration, it is necessary to know the temperature of a radiation standard, but not the ambient temperatures. Where necessary, however, the ambient temperatures can be determined from the output signals of the radiation sensor during calibration. Therefore, the method of the present invention is also especially suitable for the calibration of thermometers having a radiation sensor with built-in ambient temperature sensor, in which hence the ambient temperature sensor is not accessible from outside. It is, however, also in the calibration of other sensors that the accurate determination of the respective ambient temperatures is a relatively complex procedure. With the method herein described, time and measuring effort spent on calibration are significantly reduced, specifically for the series production of high-precision radiation thermometers intended for measuring not extremely high temperatures (for example, clinical radiation thermometers).

It shows to advantage that by using more than two radiation temperatures potential errors in the measurement of the radiation temperature and the detection of the sensor output signals can be compensated for in the calibration of the radiation thermometer.

The basic principle of the method of the present invention will be described in the following.

Generally, the radiation temperature $T_S$ to be measured by a radiation thermometer is expressable as a function f of the ambient temperature $T_U$, of the radiation sensor signal U, and of n calibration parameters $k_1, k_2, \ldots, k_n$:

$$T_S = f(T_U, U, k_1, k_2, \ldots, k_n)$$

The ambient temperature $T_U$ is determined in the radiation thermometer from the output signal R of the corresponding temperature sensor and the function g. For this purpose, m further calibration parameters $c_1, c_2, \ldots, c_m$ must be generally known:

$$T_U = g(R, c_1, c_2, \ldots, c_m)$$

For calibrating a radiation thermometer, it is thus necessary to determine the p=n+m parameters $k_1, k_2, \ldots, k_n, c_1, c_2, \ldots, c_m$. To this end, with an appropriate variation of the ambient and radiation temperature, the output signal of the radiation sensor and the output signal of the ambient temperature sensor are determined p times. From this results a (nonlinear) system of equations with p equations and p unknowns:

$$T_S = f(g(R, c_1, c_2, \ldots, c_m), U, k_1, k_2, \ldots, k_n)$$

By (numerically) solving this system of equations, the m+n parameters $k_1, k_2, \ldots, k_n, c_1, c_2, \ldots, c_m$ are obtained. The ambient temperature $T_U$ can also be determined therefrom. If more than p measuring quantities are detected, an adjustment of errors can be made.

In the following, reference is made, by way of example, to a radiation thermometer which includes a thermopile radiation sensor and a silicon resistor. The silicon resistor serves to measure the ambient temperature which in the present example is identical with the reference temperature. For calibration, in this example the following relation is utilized between the radiation temperature $T_S$, the output signal U of the radiation sensor and the ambient temperature $T_U$:

$$T_S = \left(\frac{U}{S} + T_U^4\right)^{1/4} \quad (2.1)$$

where S denotes the sensitivity of the radiation thermometer which depends, among other things, on the radiation sensor used and the optical system of the radiation thermometer. Referring to FIG. 1, this parameter is determined in the calibration by measuring at two different radiation temperatures $T_S(1)$ and $T_S(2)$ (but at a constant ambient temperature $T_U = T_U(1) = T_U(2)$) the output voltages $U(1)$ and $U(2)$ of the radiation sensor (step 100). By transforming (2.1), the following system of equations is obtained:

$$T_S(1)^4 = \frac{U(1)}{S} + T_U^4 \quad (2.2)$$

$$T_S(2)^4 = \frac{U(2)}{S} + T_U^4$$

Subtracting the first from the second equation and subsequently solving for S yields directly the sensitivity S (step 110):

$$S = \frac{U(2) - U(1)}{T_S(2)^4 - T_S(1)^4} \quad (2.3)$$

Further, using the equation (2.3) in the two equations (2.2) also enables the ambient temperature $T_U$ to be obtained (step 120):

$$T_U = \left(\frac{1}{U(2) - U(1)}[U(2)T_S(1)^4 - U(1)T_S(2)^4]\right)^{1/4} \quad (2.4)$$

or $$T_U = \left(T_S(1)^4 - \frac{U(1)}{S}\right)^{1/4} = \left(T_S(2)^4 - \frac{U(2)}{S}\right)^{1/4} \quad (2.5)$$

The resistance R of the ambient temperature sensor is expressable as follows:

$$R = R_0[1 + \alpha(T_U - T_0) + \beta(T_U - T_0)^2] \quad (2.6)$$

where $T_0$ denotes a reference temperature (25° C.) at which the resistor has the value $R_0$. Typical values for the parameters are, for example, $R_0 = 1000\ \Omega$, $\alpha = 7.8 \cdot 10^{-3}\ K^{-1}$ and $\beta = 1.9 \cdot 10^{-5}\ K^{-2}$. The parameters $R_0$, $\alpha$ and $\beta$ are conventionally indicated by the sensor manufacturer, however, with certain tolerances. By measuring the resistance R of the ambient temperature sensor at the above-determined ambient temperature $T_U$, the reference resistance $R_0$ can be determined in the calibration individually by solving the equation (2.6) for $R_0$:

$$R_0 = \frac{R}{1 + \alpha(T_U - T_0) + \beta(T_U - T_0)^2}$$

Note: These simple relations apply only if the ambient temperature is the same in the two measurements. If this is not the case, a nonlinear system of equations results which may have to be solved numerically.

If the tolerances indicated by the manufacturer for the parameters $\alpha$ and $\beta$ are too wide to achieve the requisite accuracy, these parameters can also be determined individually. For this purpose, at another constant ambient temperature $T_U' = T_U'(1) = T_U'(2)$, the output voltages $U(1)'$ and $U(2)'$ of the radiation sensor and the resistance $R(2)$ of the ambient temperature sensor are measured (step 130) and, by analogy with the foregoing, the other ambient temperature $T_U'$ is determined from the equation (2.4) or (2.5), and the parameter $\alpha$ is determined by solving the equation (2.6) for $\alpha$ (step 140). In cases where it is desired to determine also the parameter $\beta$ individually, the calibration process is repeated at a third constant ambient temperature $T_U''$, (steps 150 and 160).

By analogy and where necessary, further calibration parameters can be determined as, for example, the temperature coefficient of the sensitivity of the radiation sensor.

Also, in lieu of the equation (2.1), equations may be used for calibration which are adapted to the radiation characteristic of the measurement objects whose temperatures are to be measured with the radiation thermometer.

The above-identified method can be programmed on a microcontroller, for example. The parameters can then be determined by the microcontroller. The microcontroller can be an external device, storing the determined parameters in a suitable device of the radiation thermometer. Equally, it is also possible to utilize the microcontroller installed in a radiation thermometer for the determination of the parameters.

We claim:

1. A method of calibrating a radiation thermometer including a radiation sensor and an ambient temperature sensor, said method comprising:

using a first radiation standard having a known temperature $T_S(1)$;

while the ambient temperature sensor is at a first ambient temperature $T_U(1)$, using the radiation thermometer to read the temperature of the first radiation standard;

while using the radiation thermometer to read the temperature of the first radiation standard, measuring a first output signal $U(1)$ of the radiation sensor;

using a second radiation standard having a known temperature $T_S(2)$;

while the ambient temperature sensor is at said first ambient temperature $T_U(1)$, using the radiation thermometer to read the temperature of the second radiation standard;

while using the radiation thermometer to read the temperature of the second radiation standard, measuring a second output signal $U(2)$ of the radiation sensor; and calibrating the radiation sensor and the ambient temperature sensor by using $T_S(1)$, $T_S(2)$ and the values obtained for $U(1)$ and $U(2)$ and without using a value for $T_U(1)$ that is derived from measuring an output of the ambient sensor.

2. The method of claim 1 further comprising:

using a third radiation standard having a known temperature $T_S(3)$;

while the ambient temperature sensor is at a second ambient temperature $T_U(2)$, using the radiation thermometer to read the temperature of the third radiation standard;

while using the radiation thermometer to read the temperature of the third radiation standard, measuring a third output signal $U(3)$ of the radiation sensor;

using a fourth radiation standard having a known temperature $T_S(4)$;

while the ambient temperature sensor is at said second ambient temperature $T_U(2)$, using the radiation thermometer to read the temperature of the fourth radiation standard; and while using the radiation thermometer to read the temperature of the fourth radiation standard, measuring a fourth output signal $U(4)$ of the radiation sensor, wherein the step of calibrating the radiation sensor and the ambient sensor further involves using the values obtained for $U(3)$ and $U(4)$ and without using a measured value for $T_U(2)$.

3. The method of claim 2 further comprising using the first radiation standard as the third radiation standard so that $T_S(3)=T_S(1)$ and using the second radiation standard as the fourth radiation standard so that $T_S(4)=T_S(2)$.

4. The method of claim 2, wherein the ambient temperature sensor a temperature-responsive resistor having at a specified reference temperature a reference resistance ($R_0$), and the radiation sensor is characterized by a sensitivity (S), and wherein the step of calibrating involves calculating at least one of the reference resistance ($R_0$) of the ambient temperature sensor and the ambient temperature ($T_U$).

5. The method as claimed in claim 4, wherein the resistor has a temperature dependence that is characterized by a linear temperature coefficient and higher-order temperature coefficient, and wherein the step of calibrating involves calculating linear and higher-order temperature coefficients by using U(3) and U(4).

6. The method as claimed in claim 4 or 5, characterized in that the ambient temperature sensor is calibrated by means of the determined ambient temperature(s) ($T_u'$; $T_u''$; ...).

* * * * *